(12) United States Patent
Morabito

(10) Patent No.: US 7,320,825 B2
(45) Date of Patent: Jan. 22, 2008

(54) BARRIER COATINGS FOR OIL AND GREASE RESISTANCE

(75) Inventor: Patrick Morabito, Matamoras, PA (US)

(73) Assignee: International Paper Company, Memphis, TN (US)

( * ) Notice: Subject to any disclaimer, the term of this patent is extended or adjusted under 35 U.S.C. 154(b) by 26 days.

(21) Appl. No.: 10/448,068

(22) Filed: May 27, 2003

(65) Prior Publication Data

US 2004/0241475 A1     Dec. 2, 2004

(51) Int. Cl.
 *B32B 5/16*     (2006.01)
(52) U.S. Cl. .................. 428/402; 428/537.5; 428/507; 428/326; 428/328; 428/330; 427/391; 427/395
(58) Field of Classification Search ................ 428/402, 428/537.5, 507, 326, 328, 330; 427/391, 427/395
See application file for complete search history.

(56) References Cited

U.S. PATENT DOCUMENTS

| | | | | |
|---|---|---|---|---|
| 3,661,697 | A | * | 5/1972 | Kimmel et al. ............. 428/341 |
| 4,391,833 | A | | 7/1983 | Self et al. |
| 4,421,825 | A | * | 12/1983 | Seiter et al. ................ 428/332 |
| 5,153,061 | A | * | 10/1992 | Cavagna et al. ........... 428/325 |
| 5,776,619 | A | * | 7/1998 | Shanton ..................... 428/511 |
| 5,840,825 | A | | 11/1998 | Carlblom et al. |

FOREIGN PATENT DOCUMENTS

WO     WO 98/56861     12/1998

OTHER PUBLICATIONS

Nissi article. 1999 TAPPI Coating Conference.*
Vaha-Nisi, Filled Barrier Dispersion Coatings, 1999 TAPPI Coating Conference Technical Paper Presentation.

* cited by examiner

*Primary Examiner*—Leszek Kiliman
(74) *Attorney, Agent, or Firm*—Thomas W. Barnes, III; Richard C. Stewart, III; Evelyn M. Sommer

(57) ABSTRACT

A multi layer composite having oil and grease resistance comprising:
 a) a paper or paperboard substrate,
 b) a base coat on a surface of said substrate comprising a first polymer selected from the group consisting of film forming natural and synthetic polymers in the substantial absence of a mineral pigment filler, and
 c) a top coat on a surface of said base coat, said top coat comprising a continuous polymer phase comprising one or more film forming synthetic polymers having dispersed therein at least one platy mineral pigment and at least one non-platy mineral pigment. This invention also relates to a method of making the composite and articles of manufacture fabricated totally or in part from the composite of this invention where oil and grease resistance is required or desired, such as container, bags and wraps for packaging oily or greasy materials such as animal and human food.

27 Claims, No Drawings

BARRIER COATINGS FOR OIL AND GREASE RESISTANCE

BACKGROUND OF THE INVENTION

This invention relates to barrier coatings providing oil and grease resistance to paper and paperboard substrates. More particularly this invention relates to recyclable, FDA compliant coatings having oil and grease resistant properties and products prepared by application of such coatings to paper and paperboard substrates. When applied to the paper and paperboard, the coated product constitutes a recyclable FDA compliant product that can be used as a food contact surface.

Fluorochemical free barrier coatings are disclosed for providing oil and grease resistance to paper and paperboard, to bags, wrappings and containers prepared therefrom particularly such products used in contact with food. The barrier coatings of the invention operate to absorb the oil and/or grease and to provide a tortuous path to their migration through the coating so as to reduce or eliminate their penetration into the paper or paperboard substrate onto which they have been applied.

Accordingly, the present invention provides non-fluorochemically treated coatings for reducing and perhaps eliminating the migration of oil and/or grease originating from food products wrapped or packaged in films, containers, boxes and the like, into the paper or paperboard substrate onto which they have been applied.

Fluorochemicals are perceived as toxic and a health hazard and in some instances are additionally objectionable because they create odor or flavor changes in the food product.

It is known in the art of paperboard manufacture to apply coatings to the surface of paperboard for various reasons. For instance, U.S. Pat. No. 4,421,825, discloses the application of a coating comprising titanium dioxide and an acrylic copolymer to paperboard to minimize browning of the paperboard at temperatures up to about 205 degree C. It is also known in the art to apply barriers to the paperboard surface, particularly the food contact surface of the paperboard, to satisfy FDA requirements for safe packaging. In most instances the treatment of the paperboard or like sheet material is to prevent or inhibit the migration of contaminants from the paperboard into the packaged food stuffs (see U.S. Pat. No. 5,153,061). These barriers usually take the form of polymer coatings which have achieved FDA clearance for food contact or they may be in the form of a layer of aluminum foil laminated to the paperboard surface. Polyethylene (LDPE, HDPE, LLDPE), ethylene vinyl alcohol copolymers (EVOH), polyvinlyidene chloride (PVDC), nylon, and polyethylene terephthalate (PET) coatings are examples of such barriers. Nevertheless, such barrier materials are not applied to every packaging situation, particularly where it is desired to provide oil and grease resistance to the container by substantially eliminating oil and grease migration from the packaged foodstuffs at the coating applied onto the paperboard substrate.

In order to be effective, coatings as contemplated herein must constitute flexible films capable of resistance to penetration by oil and or grease. In addition, it is critical that these properties remain intact after the paper has been converted from a flat sheet into a label, bag or package. This is because folding the sheet can create pinholes and cracks which can reduce or eliminate any grease barrier in the coating. Synthetic polymers such as styrene acrylic latex, polyvinyl alcohol, polyvinyl acetate and a natural polymer such as starch are primarily responsible for imparting these characteristics to the coating. These polymers form crosslinkable films capable of providing barrier properties. The synthetic polymers also provide hydrophobicity. Starch is typically a more brittle film than latex and is hydrophilic. Consequently, it can crack when folded. However, by modifying its molecular weight and molecular weight distribution, a starch film can be made more flexible without losing its barrier properties.

In order to counteract the tendency of mitration, absorbing or tortuous barrier coatings can be applied to the surface of the paper or paperboard. The coatings of the absorbent type perform as a sink to absorb the oil or grease while the tortuous barrier type coatings act to provide a tortuous path for the migration of the oil or grease. Both effects can be realzied by applying a coating containing both types of materials, generally pigments.

The choice of pigments used is dependent in part on the final product desired and the type of coating equipment available for use.

It is accordingly an object of the present invention to provide a means for reducing and perhaps eliminating the migration of oil and grease from food products packed in paper or paperboard package containers and bags by applying barrier coatings to the paper or paperboard used in forming the containers or bags and the like prepared therefrom.

SUMMARY OF THE INVENTION

One aspect of this invention relates to a multi layer composite having oil and grease resistance comprising:

a) a paper or paperboard substrate, b) a base coat on a surface of said substrate comprising a first polymer selected from the group consisting of film forming natural and synthetic polymers in the substantial absence of a mineral pigment filler, and c) a top coat on a surface of said base coat, said top coat comprising a continuous polymer phase comprising one or more second film forming synthetic polymers having dispersed therein at least one platy mineral pigment and at least one mineral pigment having a non-platy crystalline structure.

The composite of this invention exhibits one or more beneficial properties. For example, the composite exhibits a resistance to oil and grease equal to or less than about 4% as measured by TAPPI-454 Turpentine Test for Grease Resistance of Paper in which turpentine was replaced by Crisco Pure Vegetable Oil run at a temperature of 140° F. for 24 hours at TAPPI conditions.

This invention also relates to articles of manufacture fabricated totally or in part from the composite of this invention where oil and grease resistance is required or desired. Such articles of manufacture include containers, bags and wraps for packaging oily or greasy materials such as animal and human food and other oily and greasy materials.

DETAILED DESCRIPTION OF THE INVENTION

The first component of the multi-layer composite of this invention is a paper or paperboard substrate. Any conventional paper or paperboard substrate can be used in the practice of this invention. Such substrates and methods and apparatus for their manufacture are well known in the art. See for example "Handbook For Pulp & Paper Technologies", $2^{nd}$ Edition, G. A. Smook, Angus Wilde Publications (1992) and references cited therein. For example, the paper and paperboard substrate can made from pulp fibers derived from hardwood trees, softwood trees, or a combination of hardwood and softwood trees prepared for use in a papermaking furnish by any known suitable digestion, refining, and bleaching operations as for example known mechanical, thermomechanical, chemical and semichemical, etc., pulping and other well known pulping processes. In certain embodiments, at least a portion of the pulp fibers may be provided from non-woody herbaceous plants including, but not limited to, kenaf, hemp, jute, flax, sisal, or abaca although legal restrictions and other considerations may make the utilization of hemp and other fiber sources impractical or impossible. Either bleached or unbleached pulp fiber may be utilized in the process of this invention. Recycled pulp fibers are also suitable for use.

The substrate can be of any basis weight. Preferably, the substrate basis weight is from about 20 to about 500 g/m$^2$, although substrate basis weight can be outside of this range if desired. The basis weight is more preferably from about 20 to about 300 g/m$^2$ and most preferably from about 50 to about 200 g/m$^2$. In the embodiments of choice, the basis weight is from about 60 to about 120 g/m$^2$.

The second component of the composite of this invention is a base coat comprising a first polymer on a surface of said substrate. The polymer is selected from the group consisting of film forming natural and synthetic polymers in the substantial absence of a mineral pigment filler. As used herein, "film forming polymers" are polymers, copolymers and terpolymers that form free standing film when solvents or liquid dispersing medium, such as water, are dried or evaporated from a polymer solutions or dispersions. Illustrative of film forming natural polymers are water soluble or water swellable naturally occurring macromolecular compounds such as include gum arabic, carrogeenan, karuga gum, xanthan, chitosan, carboxyalky hydroxy alkyl guar, n-carboxyalkyl chitin, gelatin, cationic guar, agar-agar, casein, gum arabic, sodium alginate, anionic and cationic starches (corn, potato and tapioca) and modified forms thereof and the like which can be derived by reacting the starch with a suitable chemical or enzymatic reagent such as starch acetates, starch esters, starch ethers, starch phosphates and starch xanthates, and substituted and unsubstituted alkyl and aryl celluloses and dextrans such as alkyl cellulose, hydroxyalkyl celluloses, alkylhydroxyalkyl celluloses, dehydroxyalkyl celluloses, hydroxy alkyl celluloses, halodioxy celluloses, amino deoxycelluloses, dialkyl-ammonium halide hydroxy alkyl celluloses, hydroxyalkyl trialkyl ammonium halide hydroxyalkyl cellulose, dialkyl amino alkyl cellulose's, carboyxalkyl dextrans, dialkyl aminoalkyl dextran, amino dextran, carboxy alkyl cellulose salts, and the like.

Illustrative of film forming synthetic polymers are styrene maleic anhydride, vinyl acetate polymer, styrene/acrylic acid copolymers, styrene/acrylate copolymers, polyvinyl alcohol, vinyl acetate resins, styrene butadiene copolymer, alkyl acrylics, quaternary amine based polymers, acrylic latexes, polyurethanes, substituted or unsubstituted vinyl pyrrolidone copolymers and homopolymers such as poly (vinyl benzoate-co-vinyl pyrrolidone), poly(vinyl acetate-co-vinyl pyrrolidone), poly(vinyl propionate-co-vinyl pyrrolidone), poly(vinyl formate-co-vinyl pyrrolidone), poly (vinyl alcohol-co-vinyl pyrrolidone), poly(acrylamide-co-vinyl pyrrolidone), poly(vinyl methyl ether-co-vinylpyrrolidone), poly(acylonitrile-co-vinyl pyrrolidone), poly(vinyl ethyl ether-co-vinyl pyrrolidone) and poly(vinyl pyrrolidone). Naturally occurring starches or modified form thereof are preferred for use in the formation of the base sheet. When such polymers as used in this application, experimentation has shown that when the base coat is formed by coating the surface of the substrate using a metering coating process such as a rod metered size press, transfer roll coater and blade metered size press, superior oil and grease resistance results. More preferred film forming polymers are modified starches, and most preferred film forming polymers for use in the base coat are modified alkylated or hydroxy alkylated starches such as a modified hydroxyethylated starch such as A. E. Staley 19144-R.

Experimentation has demonstrated that when the base coat is applied using a saturating coating process such as a coating process using a flooded nip size press film forming synthetic polymers are preferred. In these applications, synthetic polymers capable of forming latexes in which polymer particle sizes are preferably from about 0.1 to about 0.25 microns, more preferably from about 0.1 to about 0.2 microns and most preferably from about 0.15 to about 0.2 microns are preferred. More preferred are those of the aforementioned polymers of the preferred particle size which also are oleophobic such as vinyl acetate polymer, poly(ethylenevinyl acetate), polyvinyl alcohol, poly(acrylonitrile) and poly(vinyl pyrrolidone). Useful film forming synthetic and naturally occurring polymers may be prepared by known techniques or obtained from commercial sources. For example, naturally-occurring starches or starch like materials and modified forms thereof are commercially available from Poly Sciences, Inc., Dow Chemical Co., Hercules Chemical Co., National Starch and Chemical Company, A.E. Staley, Union Carbide Company, Sigman Chemical Company and St. Lawrence Starch. Suitable synthetic polymers can be obtained commercially from Rohm Hass, Air Products and Chemicals, Dow Chemical and BASF.

Coat weight of the base coat can vary widely provided that the desired grease resistance is provided. The coat weight is preferably at least about 2.0 lbs/3300 ft$^2$, more preferably at least about 2.5 lbs/3300 ft$^2$ and most preferably from 2.5 lbs/3300 ft$^2$ to about 4.0 lbs/3300 ft$^2$.

The third component of the composite of this invention is a top coat on a surface of the base coat. The top coat comprises a continuous polymer phase formed from one or more film forming synthetic polymers having dispersed therein at least one platy mineral pigment and at least one non-platy mineral pigment. While we do not wish to be bound by any theory, it is believed that the presence of mineral pigments in layer enhances the barrier properties as well as improves runnability on coating equipment. It is believed that the platy mineral pigment create a tortuous path for the oil and grease to travel through thus reducing penetration as compared to an un pigmented coating. However, it is believed that the structure of the platy mineral pigment can also create pinholes. While the non-platy mineral pigment does not provide the same level of grease resistance as the platy mineral pigment, it is believed that its morphology offsets the pinholes created by the platy mineral pigment. It is also believed that the non-platy pigment improves performance of the coating as a sink for the oil and grease, improving coating runnability and reducing the tendency of the roll to block or stick together due to the high polymer content of the coating.

Coat weight of the top coat can vary widely provided that the desired grease resistance is provided. The coat weight is preferably at least about 2.5 lbs/3300 ft$^2$, more preferably at least about 2.5 lbs/3300 ft$^2$ and most preferably from 2.5 lbs/3300 ft$^2$ to about 4.0 lbs/3300 ft$^2$.

The synthetic film forming polymers for use in the top coat of the composite of this invention are as described above. Preferred film forming polymers are polymers or mixtures of polymers having those having a Glass Transition Temperature of from about −5° C. to about +55° C., preferably from about 0° C. to about +45° C., more preferably from about +10° C. to about +35° C., and most preferably from about +20° C. to about +25° C. Individual polymers having Glass Transition Temperature within the desired Glass Transition Temperature range can be used, or a blend of two or more polymers individually having Glass Transition Temperatures outside of the desired Glass Transition Temperature range can be used provided that the average Glass Transition Temperature of the blend falls within the range. For example, in a preferred embodiment of the invention a blend of 87.5% styrene acrylic latex and 12.5% acrylic latex exhibits an average Glass Transition Temperature within the desired Glass Transition Temperature range while the Glass Transition Temperature of the styrene acrylic latex is below the most preferred Glass Transition Temperature range and that of the acrylic latex is above it. More preferred polymers are mixtures of styrene acrylic latex and acrylic latex.

As used herein, platy mineral pigments are those that are plate like in structure and consist of thin, ill formed, sheet-like particles of high aspect ratio (width to thickness of the particles) of greater than about 2, preferably greater than about 5, more preferably from about 10 to about 60, and most preferably from about 20 to about 40. The particle size of the pigment may vary widely and any particle size typically employed in the art may be used. For example, the particle size can be as small as about 0.5 micron or less or as large as about 10 microns. Preferred particle size is from about 1 micron to about 5 microns and most preferred particle size in from about 1 micron to about 3 microns.

The particle size distribution (% particles<2 microns) of the pigment may vary widely and any particle size distribution typically employed in the art may be used. Preferred particle size distribution is from about 30 to about 95%, preferably from about 40 to about 90% and more preferably from about 40 to about 70%. In the more preferred embodiments of the invention, two or more platy mineral pigments are used to provide a mixture having a high aspect ratio and a range of aspect ratio distributions and a range of particle sizes and particle size distributions. In these preferred embodiments, at least one of the platy mineral pigments has a particle size distribution (% particles<2 microns) within the aforementioned range and at least one of the platy mineral pigments has a particle size distribution (% particles<2 microns) of from about 30 to almost 50%, preferably from about 30 to 45%, more preferably from about 30 to about 40%, and most preferably from about 30 to about 35%.

Similarly the specific surface area (BET) of the platy pigment particles may vary widely and those typically employed in the art may be used. For example, the specific surface area can be as low as about 5 $m^2/g$ or lower and as high as about 400 $m^2/g$. The preferred specific surface area is from about 5 $m^2/g$ to about 200 $m^2/g$, the more preferred specific surface area is from about 10 $m^2/g$ to about 170 $m^2/g$ and the most preferred specific surface area is from about 10 $m^2/g$ to about 80 $m^2g$.

Illustrative of useful platy mineral pigment are delaminated clays, kaolin, talc, montmorillonite, halloysite, attapulgite, illite and natural and synthetic micas, such as muscovite, phlogopite, biotite, barium disilic and the like. Preferred platy mineral pigments are kaolin, talc and a mixture of kaolin and talc.

As used herein, non-platy mineral pigments are those that do not have a platy crystalline structure. The particle size of the non-platy pigment may vary widely and any particle size typically employed in the art may be used. For example, the particle size can be as small as about 0.5 micron or less or as large as about 10 microns. Preferred particle size is from about 1 micron to about 5 microns and most preferred particle size in from about 1 micron to about 3 microns.

The particle size distribution (% particles<2 microns) of the non-platy pigment may vary widely and any particle size distribution typically employed in the art may be used. Preferred particle size distribution is less about 80%, preferably from about 80 to about 98% and more preferably from about 90 to about 96%.

Similarly the specific surface area (BET) of the non-platy pigment particles may vary widely and those typically employed in the art may be used. For example, the specific surface area can be as low as about 5 $m^2/g$ or lower and as high as about 400 $m^2/g$. The preferred specific surface area is from about 5 $m^2/g$ to about 200 $m^2/g$, the more preferred specific surface area is from about 10 $m^2/g$ to about 170 $m^2/g$ and the most preferred specific surface area is from about 10 $m^2/g$ to about 80 $m^2g$.

Illustrative of useful non-platy mineral pigments are silica, calcium carbonate, barium sulfate, calcium sulfate, calcium silicate, aluminum hydrate, magnesium silicate, calcium sulphoaluminate, magnesium oxide, magnesium carbonate, barium carbonate, aluminum hydroxide and the like. Preferred non-platy mineral pigments are calcium carbonate, barium sulfate, calcium silicate, calcium sulfate and calcium sulphoaluminate, more preferred non-platy mineral pigments are calcium carbonate and barium sulfate and the most preferred non-platy mineral pigment is calcium carbonate.

The volume percent of pigment (by wgt of the coating) and the weight ratio of platy to non-platy pigment can vary provided that the desired oil and grease resistance results. With regard to the pigment % volume, concentration in a top coat formulation can be as high as about 80% of the total volume of the coating and is preferably from about 30 to about 50 Vol % and most preferably from about 38 to about 40 Vol %. The film forming binder is present in the top coat in an amount of from about 55 to about 75 pph (by wt) and preferably from about 60 to about 70 pph.

The weight ratio of platy to non-platy pigment may be in the range of from about 1 to about 5 to about 1 to about 10. More preferred weight ratios are from about 1 to about 2 to about 1 to about 3 and most preferred weight ratios are about 1 to about 2.

Useful platy and non-platy pigment can be obtained from commercial sources. For example, suitable non-platy calcium carbonate pigments are Omya Covercarb, Omya-Hydrocab 60, Setacarb FO/LV, NORDKRONE 40, IMERYS-Carbital 75 and suitable platy pigments talc and kaolin are Luzenac America Heliocote PT and Imerys, respectively.

The composite of this invention can be prepared using known conventional techniques. For example, the coating composition comprising the essential film forming natural and synthetic polymer in the substantial absence of a mineral pigment filler for the base coat and one or more film forming synthetic polymers and platy and non-platy mineral pigments can be dissolved or dispersed in an appropriate liquid medium, preferably water. Other additives known to those skilled in the art such as viscosity modifiers for example Alogum L289, dispersants such as Dispex NO49, calcium sterate (Colloid 211), fluorescent dyes, surfactants, deforming agents, preservatives, pH control agents, cast coating releasing agents, and the like may also be added to the coating compositions as desired. If necessary, the coating compositions may be diluted in water to meet the solids and viscosity ranges for the specific coating application method used. The coating composition can be applied to the substrate to form a final coating of the desired thickness, as for example a thickness between about 0.1 µm and about 100 µm, by any suitable technique in line at the size press or off line, such cast coating, dip coating, metered size press coating, flooded nip size press coating, Meyer rod coating, reverse roll coating, extrusion coating or the like using conventional coating tools such as a coater, air knife coater, curtain coater, bar coater, gravure coater. Metered size press coating is preferred in those embodiments where a starch or modified starch is the film forming polymer in the based coat and flooded nip size press coating is preferred in those embodiments where a synthetic polymer is the film forming polymer in the base coat. Coating application method for top coat is contour which provides a uniform coating as opposed to a leveling coating which provides a uniform surface. Preferred methods are non-contact (e.g., curtain or spray coating), more preferred are air knife, rod or roll coaters, and most preferred is roll applicator with a trailing doctor blade that has a soft polymeric tip. After application of the coating composition, the wet coated sheet is dried through use of conventional drying apparatuses.

The composite of this invention exhibits resistance to oil and grease as measured by TAPPI-454 Turpentine Test for Grease Resistance of Paper in which turpentine was replaced by Crisco Pure Vegetable Oil and the test is run at a temperature of 140° F. for 24 hours at TAPPI conditions. Using the above test, the resistance is usually equal to or less than about 4%, preferably equal to or less than about 3%, more preferably equal to or less than about 2% and most preferably equal to or less than about 1%.

The composite of this invention is useful in the manufacture of articles for which resistance to oil and grease is desired. Such articles include but is not limited to containers, bags, packaging and wraps for oily or greasy materials such as animal and human food and other oily and greasy materials. Such articles can be manufactured from the composite of this invention using conventional article manufacturing techniques that are well known in the art and will not be described in any great detail. The following non-limiting examples illustrate various additional aspects of the invention.

EXAMPLE

A. Preparation of the Coating Compositions

The coatings were prepared by adding the essential polymer and pigment components in the desired amounts and following optional components Viscosity Modifier (Alcogum L-289 from Alco), Calcium Stearate (Suncoat 450 from Rohm Nova) and Dispersant (Colloid 211 from Vininap Chemical Corp.) to water and mixing with a high shear mixer until the components were fully dispersed to form a coating composition having about 55% coating solids. Water was added to reduce the viscosity to a level that would allow the coatings to be applied to paperboard using the conventional coating methods to form composition having a Low Shear Viscosity @100 rpm in the range of 1500 to 2000 (cP).

The physical parameters of the base and top coating compositions are set forth in the following Table I in which parts are parts per 100.

TABLE I

Coating Compositions

| Coating Composition | [1]K, parts | [3]Talc, parts | [4]CC, parts | Latex parts | [2]S, parts | [7]HSP, parts |
|---|---|---|---|---|---|---|
| 1 | 50 | 35 | 15 | [5]Latex 1, 25 parts | — | — |
| 2 | 50 | 35 | 15 | Latex 1, 75 parts | — | — |
| 3 | — | — | — | — | 100 | — |
| 4 | 47 | 33 | 14 | Latex 1, 75 parts | — | 6 |
| 5 | 50 | 35 | 15 | Latex 1, 75 parts | — | 6 |
| 6 | — | — | — | [6]Latex 2, 100 parts | — | — |

The terms identified by superscripts in Table I are defined as follows:
[1]K is a kaolin clay having an aspect ratio of from 30 to 60 and an average particle size distribution of 40 to 70 wgt % less than 2 microns obtained commercially from Imerys under the trade name XP-6020.
[2]S is a modified hydroxyethylated starch obtained commercially from A. E. Staley 19144-R under the tradename.
[3]Talc is a talc clay having an average particle size distribution of 30 to 35 wgt % less than 2 microns obtained commercially from Luzenac under the trade name Heliocote X.
[4]CC is calcium carbonate having an average particle size distribution of 95 to 96 wgt % less than 2 microns obtained commercially from Omya under the trade name Covercarb.
[5]Latex 1 is a mixture of 70 parts of styrene acrylic latex obtained commercially from Rohm Nova under the trade name Rhoplex P-376 and 5 parts of styrene butadiene latex obtained commercially from Rohm Nova under the trade name Rhoplex BO 85.
[6]Latex 2 is a vinyl acetate latex obtained commercially from Air Products and Chemicals under the trade name Orion.
[7]HS is a styrene based hollow sphere pigment obtained from Rohm Nova under the trade name HP1055.

B. Preparation of the Coated Substrates:

The base coat is applied via rod or roll metered transfer and the top coat is applied using a roll applicator with a trailing doctor blade to meter the coating. The doctor blade had a soft polymer tip to facilitate the production of the desired contoured surface. These coatings were applied to paperboard that is typically constructed from a 0.018 inch thick bleached sulphate sheet composed of 35 wgt % virgin hardwood ("HWD"), 65 wgt % virgin softwood ("SWD") with 5% virgin uncoated broke. Target HWD freeness is 340 CSF units and target SWD freeness is 525 CSF units. Basis weight target is 45 lb/3300 ft$^2$ and rawstock moisture target is 3% with a size press moisture target of 2%. Coating Weight (each layer) was 3.0 to 3.5 lb/3300 ft$^2$).

The physical parameters of the coated substrates and the application method are set forth in the following Table II.

TABLE II

| Coated Substrate | Base Coat | | Top Coat | |
|---|---|---|---|---|
| | Coating Composition | Coating Method | Coating Composition | Coating Method |
| A | 1 | [1]RMSP | 2 | [3]RATB |
| B | 1 | RMSP | 2 | RATB |
| C | 3 | RMSP | 2 | RATB |
| D | 3 | RMSP | 2 | RATB |
| E | 1 | RMSP | 4 | RATB |
| F | 1 | RMSP | — | — |
| G | 4 | RMSP | — | — |
| H | 5 | RMSP | 2 | RATB |
| I | 3 | RMSP | 2 | RATB |

TABLE II-continued

| Coated Substrate | Base Coat Coating Composition | Base Coat Coating Method | Top Coat Coating Composition | Top Coat Coating Method |
|---|---|---|---|---|
| J | 3 | RMSP | 2 | RATB |
| K | 3 | (2)FNSP | 2 | RATB |
| L | 3 | FNSP | 2 | RATB |
| M | 6 | FNSP | 2 | RATB |
| M | 6 | FNSP | 2 | RATB |

The terms identified by superscripts in Table I are defined as follows:
(1)RMSP is metered size press.
(2)FNSP is flooded nip size press.
(3)RATB is roll applicator trailing blade.

C. Evaluation of the Coated Substrates for Grease Resistance:

The method followed for this testing is very similar to the TAPPI-454 Turpentine Test for Grease Resistance of Paper. The turpentine was replaced with Crisco Pure Vegetable Oil. The test was run at a higher temperature than TAPPI-454.

Samples were conditioned for 24 hours at TAPPI conditions 73° F./50% RH). Samples were cut as closely as possible to 4×4 inches. Four replicates were tested for each sample and samples were tested creased to simulated worse case conditions.

Samples were placed over a printed grid area that was printed on a 70 lb. book paper with the printed or backside up. A rigid material 1-inch ID and at least 1 inch in height with smooth ends was placed in the center of the test sample and filled with 5.0 grams of round-grained sand. The rigid tube was removed leaving a uniform area of the test sand in the center of the sample. Next 1.2 mils of red dyed pure vegetable oil was placed in the center of each pile of sand.

Samples were then placed in an oven at 140° F. Samples were observed in the oven after 24 hours. The grease resistance was measured by counting the stained grids as a percentage of the total area of the printed grid.

The results are set forth in the following Table III.

TABLE III

Grease Resistance Test Results - % failures

| Coated Substrate | Average % Failure - Creased |
|---|---|
| A | 10.0 |
| B | 14.0 |
| C | 1.0 |
| D | 0.6 |
| E | 7.5 |
| F | 7.8 |
| G | 11.0 |
| H | 5.3 |
| I | 3.0 |
| J | 2.3 |
| K | 32.5 |
| L | 8.0 |
| M | 3.8 |
| N | 2.3 |

What is claimed is:

1. A multi layer composite having oil and grease resistance comprising:
    a) a paper or paperboard substrate,
    b) a base coat on a surface of said substrate comprising a first polymer selected from the group consisting of film forming natural and synthetic polymers in the substantial absence of a mineral pigment filler, and
    c) a top coat on a surface of said base coat, said top coat comprising a continuous polymer phase comprising one or more film forming synthetic polymers having dispersed therein a mixture of at least one platy mineral pigment and at least one non-platy mineral pigment;
    Said composite exhibits an oil and grease resistance equal to or less than about 4 as measured by "TAPPI-454 Turpentine Test for Grease Resistance of Paper", in which turpentine is replaced by Crisco Pure Vegetable Oil run at a temperature of 140° F. for 24 hours at TAPPI conditions.

2. A composite according to claim 1 wherein said oil and grease resistance is equal to or less than about 3%.

3. A composite according to claim 2 wherein said oil and grease resistance is equal to or less than about 2%.

4. A composite according to claim 3 wherein said oil and grease resistance is equal to or less than about 1%.

5. A composite according to claim 1 wherein said continuous polymer phase has an average Glass Transition Temperature of from about −5° C. to 55° C.

6. A composite according to claim 5 wherein said continuous polymer phase has an average Glass Transition Temperature of from about 20° C. to 25° C.

7. A composite according to claim 1 wherein said continuous polymeric phase comprises a blend of a styrene acrylic latex and an acrylic latex.

8. A composite according to claim 1 wherein said platy mineral pigment is at least one member selected from the group consisting of Kaolin, delaminated clay, talc, mica, montmorillonite, halloysite, attapulgite and illite.

9. A composite according to claim 1 wherein said mixture of mineral pigments is Kaolin, talc and calcium carbonate.

10. A composite according to claim 1 wherein said first polymer is a synthetic polymer.

11. A composite according to claim 10 wherein said synthetic polymer is polyvinyl acetate.

12. A composite according to claim 1 wherein said first polymer is a naturally occurring polymer.

13. A composite according to claim 12 wherein said haturally occurring polymer is a starch or a modified starch.

14. A composite according to claim 12 wherein said naturally occurring polymer is a modified starch.

15. A composite according to claim 13 Wherein said modified starch is an alkylated starch.

16. A composite according to claim 13 wherein said modified starch is a modified hydroxyethylated starch.

17. A composite according to claim 1 wherein said non-platy pigment is selected from the group consisting of calcium carbonite, barium sulfate, calcium sulfate, calcium silicate, barium carbonate and calcium sulphoaluminate.

18. A composite according to claim 17 wherein said non-platy pigment is calcium carbonate, barium carbonate or barium sulfate.

19. A composite according to claim 18 wherein said non-platy pigment is calcium carbonate.

20. A composite according to claim 1 wherein the weight ratio of platy pigment to non-platy pigment is from about 1 to 5 to about 1 to 10.

21. A composite according to claim 19 wherein said ratio is from about 1 to 2 to about 1 to 3.

22. A composite according to claim 16 wherein a % pigment volume concentration is from about 30 to about 50%.

23. A composite according to claim 17 wherein a % pigment volume concentration is from about 38 to about 40%.

24. A composite according to claim 1 wherein said mixture of mineral pigments is as follows:

| | |
|---|---|
| Kaolin | About 50-75 pph (by wt.) |
| Calcium carbonate | About 15-20 pph (by wt.) |
| Talc | About 0-35 pph (by wt.). |

25. Method of reducing or eliminating the migration of oil andlor grease into a paper or paperboard substrate which comprises applying onto a surface of said substrate a base coat comprising a first polymer selected from the group consisting of film forming natural and synthetic polymers in the substantial absence of a mineral pigment filler and applying directly over said base coat a top coat comprising a continuous polymer phase comprising one or more film forming synthetic polymers having dispersed therein at least one platy mineral pigment and at least one non-platy mineral pigment.

26. Method according to claim 25 wherein said top coat is applied to provide a contoured surface.

27. An article of manufacture comprising a bottom and side walls connect to said bottom, said article manufacture totally or in part from the composite of claim 1.

* * * * *